(12) United States Patent
Stoeppelmann et al.

(10) Patent No.: US 9,290,635 B2
(45) Date of Patent: Mar. 22, 2016

(54) POLYAMIDE SHEET SILICATE COMPOSITIONS

(71) Applicant: EMS-PATENT AG, Zurich (CH)

(72) Inventors: Georg Stoeppelmann, Bonaduz (CH);
Botho Hoffmann, Domat/Ems (CH);
Manfred Hewel, Domat/Ems (CH);
Lothar Michael Ploetze, Zurich (CH);
Lorenz Meier, Zurich (CH); Bettina Vetterli, Winterthur (CH); Martina Hirayama, Nussbaumen (CH);
Viacheslav Vertlib, Moscow (RU)

(73) Assignee: EMS-PATENT AG, Domat/Ems (CH)

( * ) Notice: Subject to any disclaimer, the term of this patent is extended or adjusted under 35 U.S.C. 154(b) by 0 days.

(21) Appl. No.: 13/709,884

(22) Filed: Dec. 10, 2012

(65) Prior Publication Data

US 2013/0164477 A1 Jun. 27, 2013

Related U.S. Application Data

(63) Continuation of application No. 12/636,502, filed on Dec. 11, 2009, now abandoned.

(30) Foreign Application Priority Data

Dec. 12, 2008 (EP) ..................... 08021677

(51) Int. Cl.
*C08K 3/34* (2006.01)
*C08K 9/08* (2006.01)

(52) U.S. Cl.
CPC . *C08K 3/346* (2013.01); *C08K 9/08* (2013.01); *Y10T 428/139* (2015.01); *Y10T 428/1372* (2015.01); *Y10T 428/1397* (2015.01)

(58) Field of Classification Search
CPC ................... Y10T 428/1352; Y10T 428/1372; Y10T 428/139; Y10T 428/1393; Y10T 428/1397; C08K 3/346
USPC ............... 428/36.92, 35.7, 36.4, 36.9, 36.91; 524/445
See application file for complete search history.

(56) References Cited

U.S. PATENT DOCUMENTS

| | | | |
|---|---|---|---|
| 5,324,812 A | 6/1994 | Speranza et al. | |
| 5,578,672 A | 11/1996 | Beall et al. | |
| 5,853,886 A | 12/1998 | Pinnavaia et al. | |
| 2003/0100656 A1* | 5/2003 | Majumdar et al. ............ | 524/445 |
| 2006/0052505 A1 | 3/2006 | Pagilagan | |
| 2007/0178299 A1 | 8/2007 | Verrall | |
| 2009/0318863 A1* | 12/2009 | Chen ....................... | 604/103.01 |
| 2010/0159175 A1 | 6/2010 | Stoeppelmann et al. | |
| 2012/0000562 A1 | 1/2012 | Hoffmann et al. | |
| 2012/0028060 A1 | 2/2012 | Etzel et al. | |

FOREIGN PATENT DOCUMENTS

| EP | 0 747 323 | 12/1996 |
|---|---|---|
| EP | 1 312 582 | 5/2003 |

* cited by examiner

*Primary Examiner* — Walter B Aughenbaugh
(74) *Attorney, Agent, or Firm* — Greenblum & Bernstein, P.L.C.

(57) ABSTRACT

The invention relates to polyamide sheet silicate compositions, containing an untreated clay mineral and a water-soluble polyamide, the concentration of the clay material being greater than 30% by weight. Furthermore the invention relates to nanocomposites which contain clay minerals distributed homogeneously in a water-insoluble thermoplastic matrix. These nanocomposites are produced by mixing the polyamide sheet silicate composition and a water-insoluble thermoplastic in the melt.

16 Claims, 2 Drawing Sheets

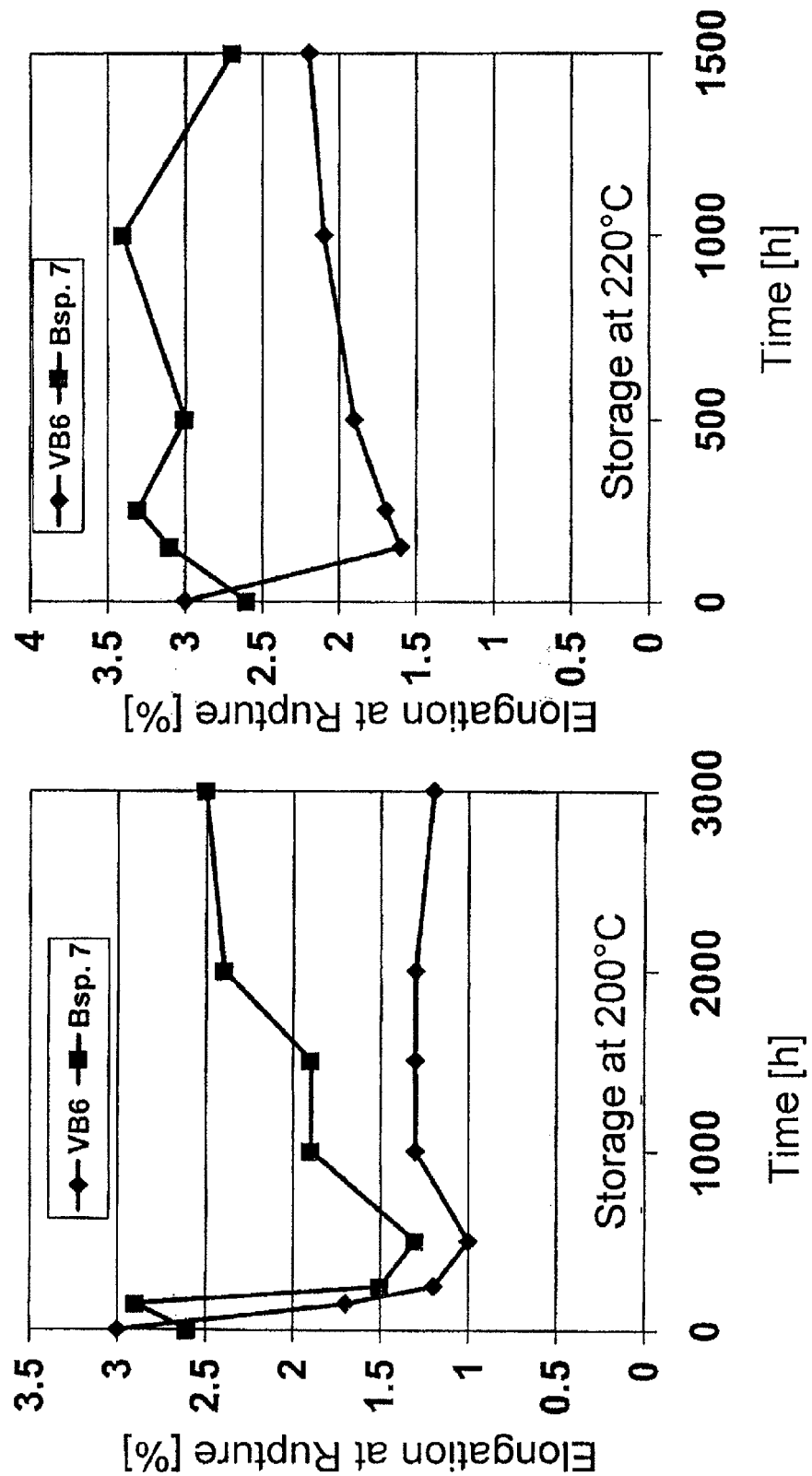

POLYAMIDE SHEET SILICATE COMPOSITIONS

CROSS-REFERENCE TO RELATED APPLICATIONS

The present application is a continuation of application Ser. No. 12/636,502 filed Dec. 11, 2009 and claims priority to EP 08 021 677.3, filed Dec. 12, 2008. The disclosures of these applications are incorporated by reference herein in their entireties.

The invention relates to polyamide sheet silicate compositions, containing an untreated clay mineral and a water-soluble polyamide, the concentration of the clay mineral being greater than 30% by weight. Furthermore, the invention relates to nanocomposites which contain clay minerals distributed homogeneously in a water-insoluble thermoplastic matrix. These nanocomposites are produced by mixing the polyamide sheet silicate composition and a water-insoluble thermoplastic in the melt.

Water-soluble polyamides are known from the state of the art. Thus U.S. Pat. No. 5,324,812 describes water-soluble polyamides based on two carboxylic acids, a low-molecular and a high-molecular polyoxyalkylene diamine. The carboxylic acid mixture comprises a dicarboxylic acid with 5 to 12 C atoms and a dicarboxylic acid with 20 to 36 C atoms. Low-molecular ether diamines such as triethylene glycol diamine or tetraethylene glycol diamine may be used. The high-molecular polyoxyalkylene diamine usually contains ethylene oxide radicals, preferably combined with polyoxypropylene units.

The swelling of clays with water-soluble polymers is likewise known in the art. EP 0 747 323 describes intercalates and exfoliates which, irrespective of the production method, are produced from sheet silicates and intercalating polymers in the presence of a liquid carrier. Intercalating polymers, preferably water-soluble polymers, such as, e.g., PVP and PVA, may be used, water being used essentially as liquid carrier. In addition, water-insoluble polymers, such as, e.g., polyamide or polyether, are also described as intercalating polymers. However, PVA and PVP are not thermally stable, with decomposition beginning at temperatures as low as 150 or 200° C. This leads to greatly discoloured and crosslinked products, as well as extensive forfeiture of water solubility.

US 2006/0052505 relates to compositions of water-soluble polyamides and sheet silicates (clay minerals). Solutions of these compositions in water are used to produce foils and plates in a casting process. The resulting flat moulded articles are recommended for packagings, in particular for chemicals. The clay minerals are used to control the solution viscosity of the water-soluble polyamides and compensate for molar mass or concentration differences of the polyamides in the casting process. Because of the posed object, i.e., the production of water-soluble packaging foils, such compositions predominantly contain polyamide and the viscosity-controlling clay mineral is present clearly in deficit, i.e. at a concentration of 0.5 to at most 30% by weight.

EP 1 312 582 describes clays and also nanocomposites intercalated with polyether block copolyamides, produced by a combination of clay, polyether block copolyamide and a thermoplastic polymer serving as matrix. The intercalation of the sheet silicate with polyether block copolyamides and the mixing of these two components with the matrix polymer is effected by means of melt-mixing, in particular by extrusion. The one-stage extrusion of all three components is preferred, i.e., without intercalation of the clay being implemented in advance. Since this method dispenses with volatile solvents, costly and time-consuming drying can be dispensed with. However, this method in which the highly viscous polymer melt and the clay are in contact for only a short time during the extrusion process (0.5-2 minutes) has the great disadvantage that the clay is not distributed homogeneously in the polymer so that clay agglomerates are present in a non-negligible concentration in the matrix.

U.S. Pat. No. 5,853,886 describes sheet silicates with intercalated polymerisable agents for producing crosslinked nanocomposites, the sheet silicates being converted into the $H^+$ form in advance for intercalation with the polymerisable agents by means of cation exchange. The intercalating polymerisable agents include low-molecular or at most oligomeric compounds which carry at least one basic group. During the intercalation, the basic groups are protonated by the $H^+$ sheet silicate. If the thus treated sheet silicates are compounded with thermoplastics which do not react or which react only a little with the crosslinking-acting agents, then these low-molecular agents remain in the thermoplastic matrix. If high processing temperatures are required, the generally highly reactive and toxic agents are released, form deposits on tools and lead to undesired subsidiary reactions which impair the quality of the moulding compound. Such moulding compounds which contain low-molecular, polymerisable agents have inadequate heat resistance. For this reason, intercalated sheet silicates of this type are suitable only for crosslinking polymer systems in which the low-molecular, functional agents can react and hence become part of the three-dimensional polymer.

Furthermore, moulding compounds containing organoclays (nanocomposites) cause disruptive deposits during injection moulding processing. Even after a long storage duration, the finished moulded articles still have the smell of amines which originate from the so-called Hofmann degradation of quaternary ammonium compounds.

The current commercial nanoclays which are all treated with quaternary ammonium ions all show the above-described disadvantages due to the Hofmann degradation. Also, the polymer sheet silicate compositions, which are known to date from the state of the art and which are based on the water-soluble polymers PVA or PVP, show inadequate temperature resistance. The thermal decomposition of PVP begins already at 150° C. whilst PVA is degraded above 200° C. into polyenes. Accompanying the decomposition is the loss of the original properties. Thus, the decomposition products are no longer water-soluble and are highly discoloured because of crosslinkings or altered polarity.

Since the mixing of nanoclays and the polyamides to be reinforced must be effected generally at temperatures significantly above 200° C. or even above 300° C. due to the high polyamide melting points, thermal damage to the organoclays or to the clay minerals intercalated with PVA or PVP, including a loss of quality in the nanocomposite moulding compounds associated therewith, is unavoidable.

The present invention provides clay material, containing at least one sheet silicate which is treated with at least one water-soluble polyamide, at least one water-soluble copolyamide and/or at least one water-soluble block copolyamide, characterised in that the proportion of sheet silicate, relative to the entire clay material, is more than 30% by weight to 60% by weight.

In some embodiments, the above-discussed clay material may be characterised in that the at least one water-soluble polyamide, at least one water-soluble copolyamide and/or at least one water-soluble block copolyamide is selected from the group comprising water-soluble polyether amides, preferably polyether amides which can be produced by polycondensation of
- a) at least one aliphatic, cycloaliphatic and/or aromatic dicarboxylic acid with 6 to 36 C atoms, and
- b) at least one aliphatic, cycloaliphatic and/or aromatic diamine with 2 to 36 C atoms, and/or
- c) at least one diamine selected from the group comprising diethylene glycol diamine, triethylene glycol diamine, tetraethylene glycol diamine, 4,7,10-trioxa-1,13-tridecane diamine, 4,7,10,13-tetraoxa-1,16-hexadecane diamine, and/or
- d) at least one polyalkylene glycol diamine, in particular polyethylene glycol diamines, polypropylene glycol diamines, polytetraethylene diamines, and/or
- e) lactams and/or aminocarboxylic acids, preferably ω-aminocarboxylic acids with 5 to 12 C atoms.

In some embodiments, the above-discussed clay material may be characterised in that the at least one water-soluble polyamide is a polycondensate comprising
- a) at least one aliphatic, cycloaliphatic and/or aromatic dicarboxylic acid with 6 to 36 C atoms, preferably 6 to 24 C atoms, particularly preferred 6 to 12 C atoms, in particular adipinic acid; and
- b) at least one diamine selected from the group comprising diethylene glycol diamine, triethylene glycol diamine, tetraoxahexadecane diamine, tetraethylene glycol diamine, trioxatridecane diamine, or at least one polyalkylene glycol diamine, in particular polyethylene glycol diamines, polypropylene glycol diamines, polytetraethylene diamines; preferably trioxatridecane diamine.

In some embodiments, the above-discussed clay material may be characterised in that the relative solution viscosity $\eta_{rel}$ of the at least one water-soluble polyamide, of the at least one water-soluble copolyamide and/or of the at least one water-soluble block copolyamide is between 1.3 and 3.0, preferably between 1.4 and 2.0, in particular between 1.5 and 1.9.

In some embodiments, the above-discussed clay material may be characterised in that the sheet silicate proportion, relative to the entire clay material, is of 34 to 55% by weight, particularly preferred 38 to 52% by weight.

In some embodiments, the above-discussed clay material may be characterised in that the proportion of the at least one water-soluble polyamide, of the at least one water-soluble copolyamide and/or of the at least one water-soluble block copolyamide, relative to the total clay material, is of 40 to 70% by weight, preferably of 45 to 66% by weight, particularly preferred of 48 to 62% by weight.

In some embodiments, the above-discussed clay material may be characterised in that the at least one sheet silicate is selected from the group comprising vermiculite, talcum and/or smectites, the smectites being in particular sodium montmorillonite, magnesium montmorillonite, calcium montmorillonite, aluminium montmorillonite, nontronite, beidellite, volkonskoite, hectorite, saponite, sauconite, sobockite, stevensite, svinfordite and/or kaolinite.

The present invention also provides methods for producing a clay material as discussed above, in which
- a) an aqueous solution of the at least one water-soluble polyamide, of the at least one water-soluble copolyamide and/or of the at least one water-soluble block copolyamide is mixed with
- b) an aqueous dispersion of the at least one sheet silicate and the water is removed after a dwell time.

In some embodiments, the above-discussed methods may be characterised in that

- a) the mass concentration of the at least one water-soluble polyamide, of the at least one water-soluble copolyamide and/or of the at least one water soluble block copolyamide in the solution is between 0.2 and 45% by weight, preferably between 1.0 and 20% by weight, particularly preferred between 2.0 and 10% by weight and/or
- b) the mass concentration of the at least one sheet silicate in the dispersion is between 0.1 and 20% by weight, preferably between 1.0 and 10% by weight, particularly preferred between 1.5 and 5% by weight.

The present invention also provides a thermoplastic moulding compound, containing a clay material which is dispersed in a water-insoluble thermoplastic matrix phase of a moulding compound as discussed herein.

In some embodiments, the above-discussed moulding compound may be characterised in that
- a) the weight proportion of the clay material, relative to the moulding compound, is between 1 and 50% by weight, preferably between 4 and 33% by weight, particularly preferred between 5 and 20% by weight, and/or
- b) the weight proportion of the matrix phase, relative to the moulding compound, is between 50 and 99% by weight, preferably between 67 and 96% by weight, particularly preferred between 80 and 95% by weight.

In some embodiments, the above-discussed moulding compound may be characterised in that the thermoplastic matrix phase is selected from the group comprising polyarylene sulphides, polylactones, polyesters, polyurethanes, polycarbonates, poly(meth)acrylates, polysulphones, polysiloxanes, polyamides, polyether amides, polyester amides and/or mixtures thereof.

In some embodiments, the above-discussed moulding compound may be characterised in that at least one additive and/or impact modifier is contained, preferably with a weight proportion of 0.3 to 30% by weight, particularly preferred between 0.5 and 20% by weight, relative to the moulding compound.

The present invention also provides a moulded article, producible from the above-discussed moulding compound.

The present invention also provides for the use of a moulded article as discussed above as a pipe, fitting, profile for transporting gases, compressed air pipe, foil, containers for packaging purposes, housings for industrial and consumer goods or mobile phone housings.

BRIEF DESCRIPTION OF THE DRAWINGS

FIG. 2 shows comparative results of heat storage of Example 7 and VB6 at 200 and 220° C.

Figure 1:
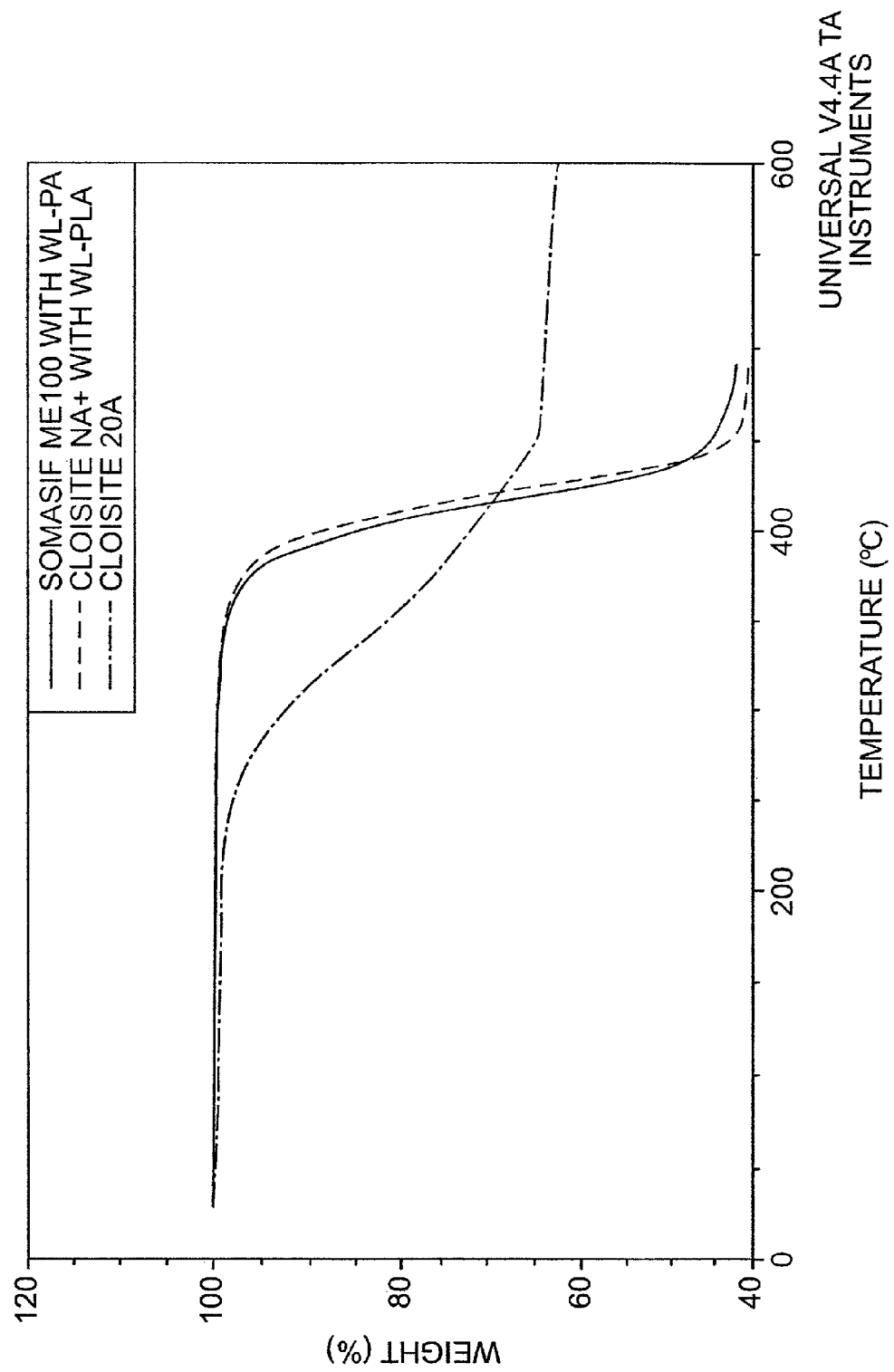
FIG. 1 is a graph showing weight loss of various clay materials during heating at a rate of 20 k/min to 500° C. in a nitrogen atmosphere.

It is therefore the object of the present invention to make available clay materials treated with polyamides (polyamide sheet silicate compositions or clay materials) with as high as possible sheet silicate concentration, which have short-term temperature stability up to 350° C. and hence can also be mixed with high-melting, thermoplastically processible polymers in the melt without disadvantageous property losses, such as, e.g., colour loss or crosslinking in the nanocomposite moulding compounds. The present invention also avoids the evaporation of toxic, malodorous or self-igniting gases during compounding. The sheet silicates are intended to be distributed substantially homogeneously extensively throughout the nanocomposites according to the invention, so that in practice no sheet silicate agglomerates are present in the thermoplastic matrix (in particular polyamide matrix) and so that moulded articles based on the nanocomposites have high toughness. Furthermore, the sheet silicates are intended to be able to be used without complex pretreatment, in particular without preceding cation exchange.

This object is achieved with the features of patent claim 1 with respect to the clay material, with the features of patent claim 12 with respect to the method for producing the clay material, and also with the features of patent claim 15 with respect to the thermoplastic moulding compound or more precisely polyamide sheet silicate concentrate. With patent claims 19 and 20, moulded articles which can be produced from the thermoplastic moulding compound and also purposes of use of such moulded articles are indicated. The respective dependent patent claims thereby represent advantageous developments.

According to the invention, hence a clay material, containing at least one sheet silicate which is treated with at least one water-soluble polyamide, at least one water-soluble copolyamide and/or at least one water-soluble block copolyamide is made available, in which the proportion of sheet silicate, relative to the entire clay material, is at least 30% by weight. Preferably untreated sheet silicates are thereby used. In particular, a preceding cation exchange is dispensed with so that no $H^+$ sheet silicates are used according to the invention.

There is termed as "water-soluble" according to the invention a polyamide which is soluble in pure water, i.e., is present at the molecular level solvated in water. In particular, water-solubility is present when at least 10 g, preferably at least 50 g and particularly preferred at least 100 g, polyamide are completely soluble in 1,000 g water at 23° C., i.e., without sediment.

Surprisingly, it was found that a montmorillonite which has been treated with a water-soluble polyamide has a significantly higher temperature stability than the commercially available systems which contain ammonium compounds, so-called organoclays. Fewer problems due to the so-called Hofmann degradation of quaternary ammonium compounds hence arise during processing. Included herein are bad odour and risk of self-ignition of the resulting degradation products on hot extruder parts.

In addition, the sheet silicates and nanocomposites treated with water-soluble polyamide according to the invention display a significantly lighter colour than the commercial organoclays.

The polyamide sheet silicate concentrates according to the invention display a significantly improved temperature stability up to 350° C., whilst, in the case of the commercial nanoclays, the degradation begins already from 200° C.

In a preferred embodiment, the at least one water-soluble polyamide, at least one water-soluble copolyamide and/or at least one water-soluble block copolyamide is selected from the group comprising water-soluble polyether amides, preferably polyether amides which can be produced by polycondensation of
a) at least one aliphatic, cycloaliphatic and/or aromatic dicarboxylic acid with 6 to 36 C atoms, and
b) at least one aliphatic, cycloaliphatic and/or aromatic diamine with 2 to 36 C atoms, and/or
c) at least one diamine selected from the group comprising diethylene glycol diamine, triethylene glycol diamine, tetraethylene glycol diamine, 4,7,10-trioxa-1,13-tridecane diamine, 4,7,10,13-tetraoxa-1,16-hexadecane diamine, and
d) at least one polyalkylene glycol diamine, in particular polyethylene glycol diamines, polypropylene glycol diamines, polytetraethylene diamines, and/or
e) lactams and/or aminocarboxylic acids, preferably ω-aminocarboxylic acids with 5 to 12 C atoms.

According to the invention, compounds described as "polymers" specified under point d) are compounds which have 5 to 25 repetition units, i.e. for example penta-, hexa-, hepta-, etc. -alkylene glycol diamines.

The water-soluble polyamide concerns in particular a cold water-soluble polyamide with a relative solution viscosity ($\eta_{rel}$) in the range of 1.3 to 3.0, preferably in the range of 1.4 to 2.0, in particular in the range of 1.5 to 1.9. There are used as water-soluble polyamide preferably polyether amides, in particular with statistical structure. The ether groups situated between the amide bonds preferably concern oxyethylene units.

The preferred polyether amides are composed as follows:
a) aliphatic, cycloaliphatic and aromatic dicarboxylic acids with 6 to 36 C atoms,
b) aliphatic, cycloaliphatic or aromatic diamines,
c) diethylene glycol diamine, triethylene glycol diamine, tetraethylene glycol diamine, 4,7,10-trioxa-1,13-tridecane diamine,
d) polyoxyalkylene diamines and possibly polyoxypropylene- and/or polyoxytetramethylene units, the polyoxyethylene units predominating,
e) lactams or aminocarboxylic acids with 5 to 12 C atoms.

Molar Ratios:

$$a:(b+c+d)=0.8 \text{ to } 1.2$$

if b≠0 then b:(c+d)<0.1 to 0.5

It is thereby of advantage if the at least one water-soluble polyamide is a polycondensate comprising
a) at least one aliphatic, cycloaliphatic and/or aromatic dicarboxylic acid with 6 to 36 C atoms, preferably 6 to 24 C atoms, particularly preferred 6 to 12 C atoms, in particular adipinic acid; and
b) at least one diamine selected from the group comprising diethylene glycol diamine, triethylene glycol diamine, tetraethylene glycol diamine, trioxatridecane diamine, tetraoxahexadecane diamine; or at least one polyalkylene glycol diamine, in particular polyethylene glycol diamines, polypropylene glycol diamines, polytetraethylene diamines; preferably trioxatridecane diamine.

Polycondensates comprising adipinic acid and trioxatridecane diamine are hereby used in particular.

In order to control the molar mass, the relative viscosity or the flowability or the MVR, there can be added to the batch, during production of the water-soluble polyamides, copolyamides or block copolyamides, regulators in the form of monocarboxylic acids or monoamines. Aliphatic, cycloaliphatic or aromatic monocarboxylic acids or monoamines, suitable as regulators, are acetic acid, propionic acid, butyric acid, valeric acid, caproic acid, lauric acid, stearic acid, 2-ethylhexane acid, cyclohexane acid, benzoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)-propylamine, methylcyclohexylamine, dimethylcyclohexylamine, benzylamine, 2-phenylethylamine, polyalkylene glycol monoamines, trioxatridecane amine. The regulators can be used individually or in combination. Also other monofunctional compounds which can react with an amino- or acid group can be used as regulators, such as anhydrides, isocyanates, acid halogenides or esters. The normal usage quantity of the regulators is between 10 and 200 mmol/kg polymer. The molar mass can be regulated alternatively or also additionally via the above-indicated molar ratio (a:(b+c+d)=0.8 to 1.2) of the diacids and diamines.

In a further advantageous embodiment, the relative solution viscosity $\eta_{rel}$ of the at least one water-soluble polyamide, of the at least one water-soluble copolyamide and/or of the at least one water-soluble block copolyamide is between 1.3 and 3.0, preferably between 1.4 and 2.0, in particular between 1.5 and 1.9.

The water-soluble polyamides are hence polymerised-out or condensed-out macromolecular compounds which are no longer changed in their structure and molar mass during compounding of the clay materials according to the invention with thermoplastics. Polymerisable, polycondensable or crosslinking-acting agents of low-molecular form are therefore not of concern.

The water-soluble polyamides according to the invention have number-average molar masses of at least 5,000 g/mol, preferably of at least 8,000 g/mol and particularly preferred of at least 10,000 g/mol. The water-soluble polyamides have a number-average molar mass in the range of 5,000 to 50,000 g/mol, preferably in the range of 8,000 to 30,000 g/mol and particularly preferred in the range of 10,000 to 25,000 g/mol.

Further advantages arise if the sheet silicate proportion, relative to the total clay material, is more than 30 to 60% by weight, preferably of 34 to 55% by weight, particularly preferred 38 to 52% by weight.

It is likewise advantageous if the proportion of the at least one water-soluble polyamide, the at least one water-soluble copolyamide and/or the at least one water-soluble block copolyamide, relative to the entire clay material, is of 40 to 70% by weight, preferably of 45 to 66% by weight, particularly preferred of 48 to 62% by weight.

The sheet silicates which are preferably used are thereby selected from the group comprising vermiculite, talcum and/or smectites, the smectites being in particular sodium montmorillonite, magnesium montmorillonite, calcium montmorillonite, aluminium montmorillonite, nontronite, beidellite, volkonskoite, hectorite, saponite, sauconite, sobockite, stevensite, svinfordite and/or kaolinite.

Sheet silicates in the sense according to the invention include 1:1- and also 2:1 sheet silicates. In these systems, layers comprising $SiO_4$-tetrahedra with those comprising $M(O,OH)_6$ octahedra are crosslinked in a regular manner with each other. M thereby stands for metal ions such as Al, Mg, Fe. In the case of the 1:1 sheet silicates, respectively one tetrahedron- and one octahedron sheet are thereby connected to each other. Examples of these are kaolin and serpentine minerals.

In the case of the 2:1 three-sheet silicates, respectively two tetrahedron sheets are combined with one octahedron sheet. If all the octahedron places are not occupied with cations of the required charge for compensation of the negative charge of the $SiO_4$ tetrahedron and also of the hydroxide ions, charged sheets occur. This negative charge is compensated for by the incorporation of monovalent cations, such as potassium, sodium or lithium, or bivalent cations, such as calcium, in the space between the sheets. Examples of 2:1 sheet silicates are talcum, vermiculites and also smectites, the smectites to which montmorillonite and hectorite belong inter alia can be easily swollen with water because of their sheet charge. Furthermore, the cations are easily accessible for exchange processes or complex formation.

The sheet thicknesses of the sheet silicates before swelling are normally 0.5 nm to 2.0 nm, very particularly preferred 0.8 nm to 1.5 nm (spacing of the sheet upper edge relative to the following sheet upper edge). It is hereby possible to increase the sheet spacing further in that the sheet silicate is converted for example with the water-soluble polyamides, e.g. at temperatures of 20° C. to 100° C., over a dwell time of generally 0.1 to 24 hours, preferably of 0.1 to 10 hours (swelling). According to the length of the dwell time and the type of water-soluble polyamide chosen, the sheet spacing increases in addition by 1 nm to 15 nm, preferably by 1 nm to 5 nm. The length of the plates is normally up to 800 nm, preferably up to 400 nm.

The swellable sheet silicates are characterised by their ion exchange capacity CEC (meq/g) and their sheet spacing $d_L$. Typical values for CEC are at 0.7 to 0.8 meq/g. The sheet spacing in the case of a dry untreated montmorillonite is at 1 nm and increases, by swelling with water and applying the water-soluble polyamide, to values up to 5 nm.

According to the invention, a method is likewise indicated for producing the above-mentioned clay material, in which
a) an aqueous solution of the at least one water-soluble polyamide, of the at least one water-soluble copolyamide and of the at least one water-soluble block copolyamide is mixed with
b) an aqueous dispersion of the at least one sheet silicate and, after a reaction time (dwell time), the water is removed. The dwell time is 0.5-24 h, preferably 0.5-12 h and particularly preferred 0.5-3 h.

A preferred embodiment of the method according to the invention provides that the at least one water-soluble polyamide, the at least one water-soluble copolyamide and/or the at least one water-soluble block copolyamide is used with a mass concentration of the solution between 0.2 and 45% by weight, preferably between 1.0 and 20% by weight, particularly preferred between 2.0 and 10% by weight.

It is likewise preferred if the mass concentration of the at least one sheet silicate in the dispersion is between 0.1 and 20% by weight, preferably between 1.0 and 10% by weight, particularly preferred between 1.5 and 5% by weight.

Furthermore, a thermoplastic moulding compound is made available according to the invention, which moulding compound contains a clay material according to the invention which is dispersed in a water-insoluble thermoplastic matrix phase of the moulding compound and is mentioned above.

It is hereby preferred that the weight proportion of the clay material, relative to the moulding compound, is between 1 and 50% by weight, preferably between 4 and 33% by weight, particularly preferred between 5 and 20% by weight.

It is likewise advantageous if the weight proportion of the matrix phase, relative to the moulding compound, is between 50 and 99% by weight, preferably between 67 and 96% by weight, particularly preferred between 80 and 95% by weight.

A preferred composition range is for example:
(a) 1 to 50% by weight polyamide sheet silicate concentrate (preferably: 4 to 33% by weight, in particular 5 to 20% by weight), containing
  (a1) 40 to 70% by weight water-soluble polyamide (preferably: 45 to 66% by weight, in particular 48 to 62% by weight) and
  (a2) 30 to 60% by weight untreated sheet silicate (preferably: 34 to 55% by weight, in particular 38 to 52% by weight)
(b) 50 to 99% by weight thermoplastic (preferably: 67 to 96% by weight, in particular 80 to 95% by weight)

Thermoplastic materials, by way of example, which can serve as matrix phase of the moulding compound, include the following: polyarylene sulphides, polylactones, polyesters, polyurethanes, polycarbonates, poly(meth)acrylates, polysulphones, polysiloxanes, polyamides, polyether amides, polyester amides and/or mixtures thereof.

For example, thermoplastic polymers can be used, such as polylactones, e.g. poly(pivalolactone), poly(caprolactone)

etc.; polyurethanes which have been produced by reactions of diisocyanates, such as e.g. 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'-diphenyl-methane diisocyanate, 3,3'dimethyl-4,4'-biphenyldiisocyanate, 4,4'-diphenylisopropylidene diisocynate, 3,3'-dimethyl-4,4'-diphenyldiisocyanate, 3,3'-dimethyl-4,4'-diphenylmethane diisocynate, 3,3'-dimethoxy-4,4'-biphenyldiisocynate, dianisidine diisocyanate, tolidine diisocyanate, hexamethylene diisocyanate, 4,4'-diisacyanatodiphenylmethane and the like; and linear long-chain diols, such as e.g. poly(tetramethylene adipate), poly(ethylene adipate), poly(1,4-butylene adipate), poly(ethylene succinate), poly(2,3-butylene succinate), polyetherdiols and the like; polycarbonates, such as e.g. poly(methane-bis(4-phenyl)carbonate), poly(1,1-ether-bis(4-phenyl)carbonate), poly(diphenylmethane-bis(4-phenyl)carbonate), poly(1,1-cyclohexane-bis(4-phenyl)carbonate), poly(2,2-bis-(4-hydroxyphenyl)propane)carbonate and the like; polysulphones; polyamides, such as e.g. poly(4-aminobutyric acid), poly(hexamethylene adipamide), poly(6-aminohexane acid), poly(m-xylylene adipamide), poly(p-xylylene sebacamide), poly(2,2,2-trimethylhexamethylene terephthalamide), poly(metaphenylene isophthalamide), poly-(p-phenylene terephthalamide), and the like; polyesters, such as e.g. poly(ethylene azelate), poly(ethylene-1,5-naphthalate), poly(ethylene-2,6-naphthalate), poly(1,4-cyclohexane dimethylene terephthalate), poly(ethylene oxybenzoate), poly(para-hydroxybenzoate), poly(1,4-cyclohexylidene dimethylene terephthalate), poly(1,4-cyclohexylidene dimethylene terephthalate), polyethylene terephthalate, polybutylene terephthalate and the like; poly(arylene oxides), such as e.g. poly(2,6-dimethyl-1,4-phenyleneoxide), poly(2,6-diphenyl-1,4-phenylene oxide) and the like; poly(arylene sulphides), such as e.g. poly(phenylene sulphides) and the like; polyether imides; vinyl polymers and their copolymers, such as e.g. polyvinylacetate, polyvinylchlorides, polyvinylbutyral, polyvinylidene chlorides, ethylene vinylacetate copolymers and the like; polyacrylates and their copolymers, such as e.g. polyethylacrylates, poly(n-butylacrylates), polymethylmethacrylates, polyethylmethacrylates, poly(n-butylmethacrylates), poly(n-propylmethacrylates), polyacrylonitrile, polyacrylic acid, ethylene acrylic acid copolymers, ethylene vinyl alcohol copolymers, acrylonitrile copolymers, methylmethacrylatestyrene copolymers, ethylene ethylacrylate copolymers, methacrylated butadienes tyrene copolymers and the like; ionomers; poly(urethanes), such as e.g. the polymerisation product of polyols, such as e.g. glycerine, trimethylolpropane, 1,2,6-hexane triole, sorbitol, pentaerythritol, polyether polyols, polyester polyols and the like, with one polyisocyanate, such as e.g. 2,4-toluene diisocyanate, 2,6-toluene diisocyanate, 4,4'-diphenylmethane diisocyanate, 1,6-hexamethylene diisocyanate, 4,4-dicyclohexylmethane diisocyanate and the like; and polysulphones, such as e.g. the reaction product of the sodium salt of 2,2-bis(4-hydroxyphenyl)propane and 4,4'-dichlorodiphenylsulphone; furan resins, such as e.g. poly(furan); cellulose ester plastic materials, such as e.g. cellulose acetate, cellulose acetate butyrate, cellulose propionate and the like; silicones, such as e.g. poly(dimethylsiloxanes), poly(dimethylsiloxanes), poly(dimethylsiloxane-co-phenylmethylsiloxanes) and the like; polyethers, polyimides; polyvinylidene halides; polycarbonates; polyphenylene sulphides; polytetrafluoroethylenes; polyacetals; polysulphonates; polyester-ionomers; polyolefin-ionomers; copolymers and mixtures of these previously mentioned polymers can likewise be used.

Polyamides which can be used in the present invention can be synthetic, linear polycarbonamides, characterised by the presence of a repeating carbonamide group as an integral part of the polymer chain, which are separated from each other by at least two carbon atoms. Polyamides of this type contain polymers which in general are known in the state of the art as nylon which is obtained by diamines and dibasic acids containing the repeating unit, represented by the general formula

—NHCOR$^1$COHNR$^2$—

R$^1$ being an alkylene group comprising at least 2 carbon atoms, preferably 2 to 11, or arylene containing at least 6 carbon atoms, preferably 6 to 17 carbon atoms; and R$^2$ being selected from R$^1$ and aryl groups. Likewise copolyamides and terpolyamides can be contained, which are obtained by known methods, e.g. by condensation of hexamethylene diamine and a mixture of dibasic acids comprising terephthalic acid and adipinic acid. The above-described polyamides are known in the state of the art and comprise for example the copolyamides of 30% hexamethylene diammonium isophthalate and 70% hexamethylene diammonium adipate, poly(hexamethylene adipamide) (nylon 6,6) poly(hexamethylene sebacamide) (nylon 6,10), poly(hexamethylene isophthalamide), poly(hexamethylene terephthalamide), poly(heptamethylene pimelamide) (nylon 7,7) poly(octamethylene suberamide) (nylon 8,8), poly(nonamethylene azelamide) (nylon 9,9) poly(decamethylene azelamide) (nylon 10,9), poly(decamethylene sebacamide) (nylon 10,10), poly(bis(4-aminocyclohexyl)methane-1,10-decane-carboxamide)), poly(m-xylylene adipamide), poly(p-xylylene sebacamide), poly(2,2,2-trimethylhexamethylene terephthalamide), poly(piperazine sebacamide), poly(p-phenylene terephthalamide), poly(metaphenylene isophthalamide) and the like.

Further suitable polyamides can be polyamides formed by polymerisation of amino acids and derivatives thereof, such as e.g. lactams. Examples of these suitable polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Preferred polyamides for use in carrying out the present invention are poly(caprolactam), poly(12-aminododecanoic acid), poly(hexamethylene adipamide), poly(m-xylylene adipamide) and poly(6-aminohexanoic acid) and copolymers and/or mixtures thereof, for their widely extending application.

In the case of the polyamides, amorphous and partly crystalline types, aliphatic, cycloaliphatic and partly aromatic polyamides are preferred. Particularly preferred polyamides thereby are: PA 6, 66, 69, 610, 612, 614, 46, MXD6-21, MXDI, MXDT, 12, 11, 1010, 1012, 1014, 1212, 4I, 5I, 6I, 8I, 9I, 10I, 12I, 4T, 5T, 6T, 8T, 9T, 10T, 12T, 6-12CHDS, MACM9-18, PACM9-18 and also copolymers and mixtures thereof, preferably PA 46, 6, 66, 11, 12, MXD6, MXD10, MXD12, MXDI, MXD6/MXDI, 6T/6I, 6T/66, 6T/10T, 9T and 10T. Also blends or polymer alloys of the above-mentioned components are possible.

The advantageous properties of the clay materials are particularly useful if the compounding with the matrix polymer (production of the nanocomposites) is implemented at temperatures above 200° C., in particular above 240° C. Hence nanocomposites also with a lower-melting matrix, such as, e.g., based on PA11, PA12, PA1010 or PA6, profit from the high temperature resistance of the clay materials according to the invention since the production and processing thereof is effected at temperatures in the range of 220 to 280° C.

The new polyamide sheet silicate concentrates are used preferably for the production of nanocomposites based on higher-melting polyamides which have a melting point of greater than 240° C., such as, e.g., PA 46, 46/4T, 46/6T, 46/66/6T, 4T/4I/46, 4T/6T, 4T/6T/66, MXD6, PA66, PA6T/66, PA6T/6I, PA6T/6I/66, PA6T/10T, PA9T, PA10T, PA12T, PA11/10T, PA12/10T, PA10T/1010.

Further polymers which can be applied in the method of the present invention are linear polyesters. The type of polyester is not crucial and the specific polyesters which are selected for use in a specific situation essentially depend upon the desired physical properties and features, e.g., the tearing strength, the modulus, and the like. Hence a large number of linear thermoplastic polyesters including crystalline and amorphous polyesters which vary greatly in their physical properties can be suitable for use in the present invention.

The specific polyester which is chosen for use can be a homopolyester or a copolyester or, as desired, a mixture thereof. Polyesters are normally formed by the condensation of organic dicarboxylic acids and organic diols and, for this reason, illustrative examples of suitable polyesters are described further on with reference to these diols and dicarboxylic acid precursors.

Polyesters which can be suitable for use in the present invention are derived by condensation of aromatic, cycloaliphatic and aliphatic diols with aliphatic, aromatic and cycloaliphatic dicarboxylic acids and can be cycloaliphatic, aliphatic or aromatic polyesters. Examples of suitable cycloaliphatic, aliphatic and aromatic polyesters which can be used in carrying out the present invention are poly(ethylene terephthalate), poly(cyclohexylene dimethylene), poly(ethylene dodecate), poly(butylene terephthalate), poly(ethylene naphthalate), poly(ethylene(2,7-naphthalate)), poly(methaphenylene isophthalate), poly(glycol acid), poly(ethylene succinate), poly(ethylene adipate), poly(ethylene sebacate), poly(decamethylene azelate), poly(ethylene sebacate), poly(decamethylene adipate), poly(decamethylene sebacate), poly(dimethylpropiolactone), poly(parahydroxybenzoate), poly(ethylene oxybenzoate), poly(ethylene isophthalate), poly(tetramethylene terephthalate), poly(hexamethylene terephthalate), poly(decamethylene terephthalate), poly(1,4-cyclohexane dimethylene terephthalate) (trans), poly(ethylene-1,5-naphthalate), poly(ethylene-2,6-naphthalate), poly(1,4-cyclohexylene dimethylene terephthalate), and poly(1,4-cyclohexylene dimethylene terephthalate). Polyester components which are produced by the condensation of a diol and an aromatic dicarboxylic acid are preferred for use in the present invention.

Examples of such suitable aromatic carboxylic acids are terephthalic acid, isophthalic acid and ophthalic acid, 1,3-naphthalene dicarboxylic acid, 1,4 naphthalene dicarboxylic acid, 2,6-naphthalene dicarboxylic acid, 2,7-naphthalene dicarboxylic acid, 4,4'-diphenyl dicarboxylic acid, 4,4'-diphenylsulphone dicarboxylic acid, 1,1,3-trimethyl-5-carboxy-3-(p-carboxyphenyl)-idan, diphenylether-4,4'-dicarboxylic acid, bis-p(carboxyphenyl)methane and the like. Of the previously mentioned aromatic dicarboxylic acids, those which are based on a benzene ring (e.g., terephthalic acid, isophthalic acid, orthophthalic acid) are preferred for use in carrying out the present invention. Amongst these acid precursors, terephthalic acid is particularly preferred as acid precursor since it leads to polyesters which, during the melting process, are less susceptible to decomposition and are more dimensionally stable.

Preferred polyesters for use in practice of the present invention are poly(ethylene terephthalate), poly(butylene terephthalate), poly(1,4-cyclohexylene dimethylene terephthalate) and poly(ethylene naphthalate) and copolymers and mixtures thereof. Of these selected polyesters, poly(ethylene terephthalate) is particularly preferred because of its excellent mechanical strength and producibility.

It is likewise possible and advantageous that the moulding compound can contain the normal additives and/or impact modifiers which are contained preferably with a weight proportion of 0.3 to 30% by weight, particularly preferred between 0.5 and 20% by weight, relative to the moulding compound.

The moulding compounds can contain as fillers fibrous or particulate filling materials in quantities of 5 to 60% by weight, in particular in quantities of 5 to 50% by weight, per 100 parts by weight of the nanocomposites (comprising components (a) and (b)). Examples of suitable fibrous fillers are glass fibres, in particular E-glass fibres, carbon fibres, metal fibres, potassium titanate whiskers or aramide fibres. When using glass fibres, these can be equipped for better compatibility with the matrix material with a sizing and an adhesive. The carbon- and glass fibres which are used with a circular cross-section in general have a diameter in the range of 5 to 20 µm. Flat glass fibres which have a non-circular, but oval, elliptical, cocoon-like, rectangular or almost rectangular cross-section have a ratio of the cross-sectional axes of 2 to 10, in particular of 3 to 5. The incorporation of round or flat glass fibres can be effected both in the form of short glass fibres and in the form of endless strands (rovings).

Examples of suitable particulate fillers are talcum, mica, silicate, quartz, titanium dioxide, wollastonite, kaolin, amorphous silicic acids, magnesium carbonate, magnesium hydroxide, chalk, lime, feldspar, barium sulphate, glass balls.

The moulding compounds according to the invention can contain in addition further supplements. There may be mentioned as such supplements for example processing aids, stabilisers and oxidation delayers, agents against heat decomposition and decomposition by ultraviolet light, lubricants and mould-release agents, flame protection means, colourants, pigments and plasticisers.

According to the invention, a moulded article is likewise provided which can be produced from a previously described moulding compound. Purposes of use of such moulded articles are for example uses as a pipe, fitting, profile for transporting gases, compressed air pipe, foil, containers for packaging purposes, housings for industrial and consumer goods or mobile phone housings.

The present invention is explained in more detail with reference to the subsequent examples without restricting the invention to the parameters indicated in the example.

In the examples and comparative examples, the materials mentioned subsequently were used:

PA 12: Grilamid L20, EMS-CHEMIE AG, Switzerland
PA 6: Grilon F34, EMS-CHEMIE AG, Switzerland
PA66: Radipol A45, Radici, Italy
PA 6T/10T: Grivory HT3, EMS-CHEMIE AG, Switzerland
WL-PA: water-soluble polyamide comprising 4,7,10-trioxatridecane-1,13-diamine and adipinic acid, according to example 1
Clay material A: polyamide sheet silicate composition according to example 2a
Clay material B: polyamide sheet silicate composition according to example 2b
Organoclay Cloisite A20, a montmorillonite treated with quaternary ammonium compounds, Southern Clay Products Inc., USA Glass fibre Vetrotex 995, France The test pieces were produced on an Arburg injection moulding unit, the cylinder temperatures for the examples with PA6 and PA12 being in the range of 240° C. to 280° C. and, for the examples with PA6T/10T, in the range of 300° C. to 320° C. The moulding temperature with PA6 or PA12 was 60 to 80° C. and, with PA6T/10T, approx. 120° C. The speed of rotation was chosen such that a screw circumferential speed of 15 m/min resulted.

The measurements were implemented according to the following standards and on the following test pieces.

Tensile Modulus of Elasticity, Yield Stress, Elongation during Yield Stress:
 ISO 527 with a tensile speed of 1 mm/min
 ISO tensile test piece, standard: ISO/CD 3167, Type A1, 170×20/10×4 mm, temperature 23° C.

Tearing Strength and Breaking Elongation:
 ISO 527 with a tensile speed of 50 mm/min
 ISO tensile test piece, standard: ISO/CD 3167, Type A1, 170×20/10×4 mm, temperature 23° C.

Melting Temperature (Tm)
 ISO standard 11357-1/-2
 Granulate

The differential scanning calorimetry (DSC) was implemented with a heating rate of 20° C./min.

Relative Viscosity:
 DIN EN ISO 307, in 0.5% by weight m-cresol solution, temperature 20° C.

MVR: (Melt Volume Rate)
 according to ISO 1133 at 275° C. and a loading of 5 kg

HDT A (1.8 MPa)
 ISO 75
 ISO impact test piece 80×10×4 mm

Ash Content:
The clay mineral concentration in the clay material or nanocomposite is determined by incineration. For this purpose, granulate is weighed into a platinum crucible and incinerated in the muffle-type furnace at 550° C. until weight constancy.

TGA:
The TGA curves were recorded by means of a TA instrument TGA Q500; the samples were heated in the platinum crucible in a nitrogen atmosphere at a heating rate of 20 K/mm to 500° C., the weight loss being registered.

If not annotated otherwise in the table, the test pieces are used in the dry state. For this purpose, the test pieces are stored in dry surroundings at room temperature for at least 48 h after the injection moulding.

The production of the polyamide sheet silicate concentrate is effected preferably via the aqueous phase, i.e. in the first step, the aqueous solution of the water-soluble polyamide is brought together with the sheet silicate or a dispersion of the sheet silicate in water. The water concentration of the mixture of water-soluble polyamide, sheet silicate and water is in the range of 2 to 98% by weight, preferably in the range of 5 to 90% by weight and particular preferred in the range between 10 and 80% by weight. After a mixing and swelling phase, the water is withdrawn by drying. For this purpose, the above solution/dispersion is evaporated at 80 to 100° C. or subjected to spray drying. However, it is also possible as an option that, before the actual drying, a concentration of the aqueous mixture/dispersion is effected with respect to the treated clay by means of a centrifuge. Water, but also excess water-soluble polyamide is hereby removed so that, with this method, also higher-concentrated clay materials, i.e., with a lower content of water-soluble polyamide, can be obtained.

The alternative production of the clay materials is effected by compounding of the clay materials with the water-soluble polyamide, no water or only very little being used, such as, e.g., 2 to 10% by weight relative to the total clay material.

The added water is removed entirely or partially from the polyamide sheet silicate composition in the degassing zone of the extruder so that disturbance-free discharge and granulation of the moulding compound is ensured.

EXAMPLES FOR PRODUCTION

Example 2A

Solution 1: 37.5 g of a water-soluble polyamide is dissolved in 500 g water at room temperature.

Solution 2: 25 g sheet silicate (Cloisite $Na^+$) are dispersed in 975 g water with the help of an Ultraturrax and an ultrasonic bar (10 minutes ultrasound).

The two solutions A and B are combined, agitated for one hour and then left to stand for 12 hours.

By drying at 80° C., the water is removed. Thereafter, the concentrate is transferred into a form which can be metered for the compounding by coarse grinding.

A polyamide sheet silicate concentrate is obtained, comprising 60% by weight water-soluble polyamide and 40% by weight sheet silicate.

Example 2B

The clay material B is produced analogously to example 2A, Somasif ME100 (CO-OP Chemicals), Japan) being used as clay mineral.

Nanocomposites

Examples 3 to 7 and Comparative Examples VB3 to VB6

The nanocomposites according to the invention are obtained by melt-mixing of thermoplastic polymers with the above-described polyamide sheet silicate concentrates. The clays treated by means of the water-soluble polyamide are thereby dispersed homogeneously in the matrix polymer. Because of the very good swelling properties of the aqueous polyamide solutions and the excellent compatibility of the water-soluble polyether amides with many matrix polymers, in particular with other polyamides, complete dispersion of the clay particles takes place so that the nanocomposites according to the invention are virtually free of any clay agglomerates.

Production

Water-insoluble polyamide, polyamide sheet silicate concentrate and any possible additives are metered into the feed of a constant rotating twin-shaft extruder (WP ZSK 25) and extruded under the conditions indicated in Table 1 and 2.

Production of the Water-Soluble Polyamide

Example 1

59.82 kg adipinic acid, 90.18 kg trioxatridecane diamine and 10 kg water were filled into a reactor, made inert with nitrogen and heated to 245° C. As soon as this temperature was reached, the pressure-reduction began. After reaching this temperature, the reactor was reduced to normal pressure within 1 h. The polymer melt was maintained then for a further hour with agitation at 245° C., the reaction water being removed at normal pressure by passing nitrogen thereover. After compression of 5 bar nitrogen, the reactor contents were discharged through a nozzle plate. After cooling the polymer strands on a fluidised bed, the latter were granulated.

The polyether amide formed had a relative solution viscosity of 1.93, a COOH end group concentration of 31 mmol/kg and also an NH₂ end group concentration of 38 mmol/kg and was readily soluble in cold water.

FIG. 1 shows the weight loss which various clay materials suffer during heating at a rate of 20 k/min to 500° C. in nitrogen (TGA: thermogravimetric analysis). The organoclay Cloisite A20 (a clay material of the state of the art), a montmorillonite treated with quaternary ammonium compounds, already suffers a massive weight loss from 200° C. This means that, above 200° C., decomposition (Hofmann degradation) and evaporation of the decomposition products takes place. These volatile decomposition products lead, during processing, to unacceptable restrictions and quality losses. During injection moulding, significant deposits arise in the mould and/or on the moulded articles, for example, even after a few cycles. During the extrusion of flat foils, such deposits on the withdrawal rolls cause the formation of holes in the foil.

In contrast, the clay materials A (example 2A) and B (example 2B) according to the invention, the montmorillonites sodium Cloisite (Cloisite Na⁺) and Somasif ME100 treated with water-soluble polyamide, are stable up to a temperature of 360° C., i.e., neither decomposition nor evaporation of the contents occurs.

The examples and comparative examples show that the difference in the moduli of elasticity of nanocomposites according to the invention and the associated matrix is the same or slightly higher than the difference in the moduli of elasticity of conventional nanocomposites and of the corresponding matrix. This means that the clay materials according to the invention effect an at least equally high reinforcement relative to the underlying polymer matrix than the clays modified according to the state of the art. The nanocomposites according to the invention are distinguished in total by good mechanical and thermal properties. It was observed in particular that the new nanocomposites have a tendency to be significantly tougher, which is manifested in a higher tearing elongation in comparison with the nanocomposites of the state of the art (e.g., comparison of example 3 with VB3b, the measured breaking elongations being at 230% or 170%; or comparison of example 4 with VB4b, the breaking elongations being 40% or 4%). Granulate and also moulded articles made of the nanocomposites VB3b, VB4b and VB5b smell unpleasantly of amines, whilst granulate and moulded articles made of the nanocomposites according to the invention have a neutral, polyimide-typical smell. It is also advantageous that, during production and processing of the nanocomposites according to the invention, no toxic, inflammable gases are emitted.

TABLE 1

Examples 3 and 4 and also comparative examples VB3 and VB4

| Composition | Unit | 3 | VB3a | VB3b | VB3c | 4 | VB4a | VB4b | VB4c |
|---|---|---|---|---|---|---|---|---|---|
| PA12 (Grilamid L20) | % by weight | 89.2 | 93.2 | 92.7 | 99.2 | | | | |
| PA6 (Grilon F34) | % by weight | | | | | 89.2 | 93.2 | 92.7 | 99.2 |
| Clay material A | % by weight | 10.0 | | | | 10.0 | | | |
| Organoclay | % by weight | | | | 6.5 | | | | 6.5 |
| WL-PA | % by weight | | 6.0 | | | | 6.0 | | |
| Heat stabilisation | % by weight | 0.8 | 0.8 | 0.8 | 0.8 | 0.8 | 0.8 | 0.8 | 0.8 |
| Compounding | | | | | | | | | |
| Temperature range | ° C. | 230-240 | 230-240 | 230-240 | 230-240 | 250-260 | 250-260 | 250-260 | 250-260 |
| Screw speed of rotation | rpm | 450 | 450 | 450 | 450 | 450 | 450 | 450 | 450 |
| Degassing | mbar | 150 | 150 | 150 | 150 | 150 | 150 | 150 | 150 |
| Compound temperature | ° C. | 260 | 258 | 257 | 260 | 282 | 280 | 281 | 279 |
| Throughput | kg/h | 15 | 15 | 15 | 15 | 15 | 15 | 15 | 15 |
| Properties | | | | | | | | | |
| Melting point | ° C. | 178 | — | 178 | — | 220 | — | 220 | — |
| MVR (270° C./5 kg) | cm³/10 min | 24 | 40 | 28 | 40 | 32 | 40 | 31 | 40 |
| Ash content | % by weight | 3.8 | <0.1 | 4.1 | <0.1 | 3.8 | <0.1 | 4.0 | <0.1 |
| Tensile modulus of elasticity | MPa | 1930 | 1500 | 2050 | 1600 | 4100 | 2800 | 4400 | 3200 |
| Yield stress | MPa | 52 | 47 | 50 | 48 | 93 | 72 | 89 | 85 |
| Elongation during yield stress | % | 5.1 | 5.1 | 5 | 5 | 4.3 | 4.3 | 4.0 | 4.0 |
| Tearing resistance | MPa | 58 | 54 | 47 | 43 | 20 | 40 | 100 | 51 |
| Breaking elongation | % | 230 | 280 | 170 | 200 | 40 | 80 | 4 | 20 |
| HDT A | ° C. | 57 | 50 | 50 | 50 | 94 | 65 | 97 | 65 |
| Release of amines during extrusion | — | no | no | yes | no | no | no | yes | no |
| Mould deposits SPG | — | no | no | yes | no | no | no | yes | no |
| Clay agglomerate (light microscopy) | — | practically none | — | a few | — | practically none | — | a few | — |
| Smell of the moulded articles | — | neutral | neutral | of amine | neutral | neutral | neutral | of amine | neutral |

TABLE 2

Examples 5 to 7 and comparative examples VB5 and VB6

| | Unit | 5 | VB5a | VB5b | VB5c | 6 | 7 | VB6 |
|---|---|---|---|---|---|---|---|---|
| Composition | | | | | | | | |
| PA6T/10T | % by weight | 89.2 | 93.2 | 92.7 | 99.2 | | | |
| PA6 | % by weight | | | | | 37.1 | 33.2 | 36.95 |
| PA66 | % by weight | | | | | 37.1 | 33.2 | 36.95 |
| Glass fibre | % by weight | | | | | 15 | 15 | 15 |
| Tafmer MC201 | % by weight | | | | | | 5.0 | 5.0 |

TABLE 2-continued

Examples 5 to 7 and comparative examples VB5 and VB6

|  | Unit | 5 | VB5a | VB5b | VB5c | 6 | 7 | VB6 |
|---|---|---|---|---|---|---|---|---|
| Clay material A | % by weight | 10.0 |  |  |  | 10 | 12.5 |  |
| Organoclay | % by weight |  |  | 6.5 |  |  |  | 5.0 |
| WL-PA | % by weight |  | 6.0 |  |  |  |  |  |
| Euthylenblack | % by weight |  |  |  |  |  | 0.75 | 0.75 |
| Heat stabilisation | % by weight | 0.8 | 0.8 | 0.8 | 0.8 | 0.8 | 0.35 | 0.35 |
| Compounding |  |  |  |  |  |  |  |  |
| Temperature range | °C. | 300-330 | 300-330 | 300-330 | 300-330 | 270-290 | 270-290 | 270-290 |
| Screw speed of rotation | Upm | 400 | 400 | 400 | 400 | 400 | 400 | 400 |
| Degassing | mbar | 150 | 150 | 150 | 150 | 150 | 150 | 150 |
| Mass temperature | °C. | 330 | 330 | 328 | 332 | 285 | 285 | 285 |
| Throughput | kg/h | 15 | 15 | 15 | 15 | 15 | 15 | 15 |
| Properties |  |  |  |  |  |  |  |  |
| Melting point | °C. | 295 | — | 295 | — | 260 | 260 | 260 |
| MVR (320° C./5 kg) | cm$^3$/10 min | 38 | 80 | 22 | 108 | — |  |  |
| Ash content | % by weight | 3.6 | <0.1 | 3.8 | <0.1 | 3.7 |  |  |
| Tensile modulus of elasticity | MPa | 4000 | 2700 | 3800 | 3000 | 6300 | 6100 | 5800 |
| Tearing resistance | MPA | 82 | 82 | 55 | 70 | 105 | 89 | 59 |
| Breaking elongation | % | 6 | 6 | 5 | 6 | 4 | 2.6 | 3.0 |
| HDT A | °C. | 120 | 105 | 128 | 118 | 195 | — | — |
| Release of amines during extrusion | — | no | no | yes | no | no | no | yes |
| Mould deposits SPG | — | no | no | yes | no | no | no | yes |
| Clay agglomerates (microscopy) | — | none | — | a few | — | none | none | a few |
| Smell of the moulded articles | — | neutral | neutral | of amine | neutral | neutral | neutral | of amine |

The clay materials according to the present invention not only show an increased stability during processing, which means that no amines are released, but also exhibit an increased long-term-resistance. Comparative storing in an oven at 200 and 220° C., respectively with ISO-tension bars (170 x 20/10 x 4 mm) of the materials according to example 7 and comparative example 6 (see table 2 and FIG. 2) result in a by far enhanced temperature resistance when using the clay material according to present invention. Thus, according to example 7, the primary elongation at rupture according to ISO 527 at 200° C. and 3000 h and 220° C. and 1500 h, respectively, has been maintained to a large extend.

What is claimed is:

1. Clay material, comprising:
   at least one sheet silicate; and
   at least one water-soluble polyamide,
   wherein the proportion of sheet silicate, relative to the entire clay material, is 30% by weight to 60% by weight, and
   wherein at least 10 g of the at least one water-soluble polyamide is completely soluble in 1000 g water at 23° C. and
   wherein the at least one water-soluble polyamide is a polycondensate obtained by polycondensation of:
   a) at least one aliphatic (including cycloaliphatic) and/or aromatic dicarboxylic acid with 6 to 36 C atoms; and
   b) at least one diamine selected from diethylene glycol diamine, triethylene glycol diamine, tetraoxahexadecane diamine, tetraethylene glycol diamine, and trioxatridecane diamine.

2. Clay material according to claim 1, wherein the relative solution viscosity $\eta_{rel}$ of the at least one water-soluble polyamide is between 1.3 and 3.0.

3. Clay material according to claim 1, wherein the sheet silicate proportion, relative to the entire clay material, is 34 to 55% by weight.

4. Clay material according to claim 1, wherein the proportion of the at least one water-soluble polyamide relative to the total clay material, is 40 to 70% by weight.

5. Clay material according to claim 1, wherein the at least one sheet silicate is selected from vermiculite, talcum and/or smectite.

6. Clay material according to claim 5, wherein the smectite is selected from sodium montmorillonite, magnesium montmorillonite, calcium montmorillonite, aluminium montmorillonite, nontronite, beidellite, volkonskoite, hectorite, saponite, sauconite, sobockite, stevensite, svinfordite and/or kaolinite.

7. A method for producing a clay material according to claim 1, comprising
   a) mixing an aqueous solution of the at least one water-soluble polyamide with an aqueous dispersion of the at least one sheet silicate; and
   b) removing the water after a dwell time.

8. The method according to claim 7, wherein
   a) the mass concentration of the at least one water-soluble polyamide in the solution is between 0.2 and 45% by weight, and/or
   b) the mass concentration of the at least one sheet silicate in the dispersion is between 0.1 and 20% by weight.

9. A thermoplastic moulding compound, comprising a clay material according to claim 1, which is dispersed in a water-insoluble thermoplastic matrix phase of the moulding compound.

10. A moulding compound according to claim 9, wherein the weight proportion of the clay material, relative to the moulding compound, is between 1 and 50% by weight.

11. A moulding compound according to claim 9, wherein the thermoplastic matrix phase is selected from polyarylene sulphides, polylactones, polyesters, polyurethanes, polycarbonates, poly(meth)acrylates, polysulphones, polysiloxanes, polyamides, polyether amides, polyester amides and/or mixtures thereof.

12. A moulding compound according to claim 9, further comprising at least one additive and/or impact modifier.

13. A moulding compound according to claim 12, wherein the proportion of the at least one additive and/or impact modifier is 0.3 to 30% by weight, relative to the entire moulding compound.

14. A moulded article, produced from a moulding compound according to claim 9.

15. A pipe, fitting, profile for transporting gases, compressed air pipe, foil, container for packaging purposes, housing for industrial and consumer goods, or mobile phone housing comprising the moulded article according to claim 14.

16. A moulding compound according to claim 9, wherein the weight proportion of the matrix phase, relative to the entire moulding compound, is between 50 and 99% by weight.

* * * * *